(12) United States Patent
Tian et al.

(10) Patent No.: US 8,135,071 B2
(45) Date of Patent: Mar. 13, 2012

(54) BREAKPOINT DETERMINING FOR HYBRID VARIABLE LENGTH CODING USING RELATIONSHIP TO NEIGHBORING BLOCKS

(75) Inventors: Dihong Tian, San Jose, CA (US); Wen-hsiung Chen, Sunnyvale, CA (US); Pi Sheng Chang, San Jose, CA (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1307 days.

(21) Appl. No.: 11/686,898

(22) Filed: Mar. 15, 2007

(65) Prior Publication Data

US 2008/0181299 A1 Jul. 31, 2008

Related U.S. Application Data

(60) Provisional application No. 60/885,075, filed on Jan. 16, 2007.

(51) Int. Cl.
*H04N 7/12* (2006.01)
(52) U.S. Cl. .............. 375/240.23; 375/240.03
(58) Field of Classification Search .............. 375/240.23, 375/240.03
See application file for complete search history.

(56) References Cited

U.S. PATENT DOCUMENTS

| | | | | |
|---|---|---|---|---|
| 4,698,672 | A | 10/1987 | Chen et al. | 358/136 |
| 4,821,119 | A | 4/1989 | Gharavi | 375/240.16 |
| 5,640,420 | A | 6/1997 | Jung | 375/240 |
| 5,751,232 | A | 5/1998 | Inoue et al. | 341/63 |
| 7,203,372 | B1 | 4/2007 | Chen et al. | 382/244 |
| 7,212,681 | B1 | 5/2007 | Chen et al. | 382/248 |
| 7,242,328 | B1 | 7/2007 | Chen et al. | |
| 2004/0228540 | A1 | 11/2004 | Chen et al. | 382/246 |
| 2004/0258153 | A1* | 12/2004 | Linzer | 375/240.16 |
| 2005/0013376 | A1* | 1/2005 | Dattani et al. | 375/240.24 |
| 2005/0276487 | A1 | 12/2005 | Chen et al. | 382/232 |
| 2005/0276497 | A1 | 12/2005 | Chen et al. | 382/245 |
| 2005/0276498 | A1 | 12/2005 | Chen et al. | 382/245 |
| 2005/0276499 | A1 | 12/2005 | Wu et al. | 382/245 |
| 2006/0039615 | A1 | 2/2006 | Chen et al. | 382/232 |

(Continued)

OTHER PUBLICATIONS

Cuenca, Pedra et al., "Breakpoint Tuning in DCT-Based Nonlinear Layered Video Codecs", 2004, EURASIP Journal on Applied Signal Processing, pp. 2555-2570.*

(Continued)

*Primary Examiner* — Michael Pyzocha
(74) *Attorney, Agent, or Firm* — Dov Rosenfeld; Inventek

(57) ABSTRACT

A method, and apparatus, and logic encoded in one or more computer-readable tangible medium to carry out a method. The method is to code an ordered sequence of quantized transform coefficients of a block of image data using a hybrid coding method that includes determining a breakpoint location in the sequence between a low-frequency region and a high-frequency region; coding the low-frequency region using a selected low-frequency variable length coding method; coding the high-frequency region using a selected high-frequency variable length coding method; and coding the location of the breakpoint. The breakpoint location is determined as a function of properties of neighboring blocks such that little if any information needs to be sent to a decoder about the breakpoint of a block or multi-block partition, and the decoder can use the properties of neighboring blocks to determine the breakpoint used to code a to-be-decoded sequence or sequences of a block or a multi-block partition.

27 Claims, 7 Drawing Sheets

U.S. PATENT DOCUMENTS

| | | | |
|---|---|---|---|
| 2006/0039616 A1 | 2/2006 | Chen et al. | 382/232 |
| 2006/0039620 A1 | 2/2006 | Chen et al. | 382/245 |
| 2006/0039621 A1 | 2/2006 | Toebes et al. | 382/245 |
| 2006/0056720 A1 | 3/2006 | Chen et al. | 382/245 |
| 2007/0019877 A1 | 1/2007 | Chen et al. | 382/245 |

OTHER PUBLICATIONS

Cuenca et al: "Breakpoint Tuning in DCT-Based Nonlinear Layered Video Codecs", 2004, EURASIP Journal on Applied Signal Processing, pp. 2555-2570.

* cited by examiner

BREAKPOINT DETERMINING FOR HYBRID VARIABLE LENGTH CODING USING RELATIONSHIP TO NEIGHBORING BLOCKS

RELATED PATENT APPLICATIONS

The present invention claims priority of and is a conversion of U.S. Provisional Patent Application No. 60/885,075 filed Jan. 16, 2007 to inventors Tian et al., titled Breakpoint Determining for Hybrid Variable Length Coding. The contents of such U.S. Application No. 60/885,075 are incorporated herein by reference.

The present invention is also related to concurrently filed U.S. application Ser. No. 11/686,778 to inventors Tian et al. titled PER BLOCK BREAKPOINT DETERMINING FOR HYBRID VARIABLE LENGTH CODING that discloses breakpoint determining methods called "per block methods" herein and that is referred to as the Per Block Breakpoint Determining patent application hereinafter. The present invention is also related to concurrently filed U.S. application Ser. No. 11/686,860 to inventors Tian et al. titled PER MULTI-BLOCK PARTITION BREAKPOINT DETERMINING FOR HYBRID VARIABLE LENGTH CODING that discloses breakpoint determining methods called "per multi-block methods" herein and that is referred to as the Per Multi-Block Breakpoint Determining patent application hereinafter. The contents of each such U.S. Application are also incorporated herein by reference.

FIELD OF THE INVENTION

The present disclosure is related generally to image compression and video compression.

BACKGROUND

Modern transform-based image compression methods include transforming blocks of image data, quantizing the transform coefficients, then ordering the coefficients along a path in the two-dimensional coefficient plane, and entropy coding the ordered sequence of quantized coefficients. Quantization is such that 0 is the most-likely-to-occur coefficient amplitude. Conventional two-dimensional variable length coding is commonly used in image and video compression for the entropy coding, and includes coding the position of each non-zero-value coefficient and its amplitude simultaneously as a pair, which typically results in a shorter average code length than coding the position and amplitude separately. In a block-based transform coding, however, there are often a number of consecutive non-zero-value coefficients along a low-frequency region of the coding path. Instead of using a single code to represent the "n" consecutive coefficients, conventional two-dimensional variable length coding requires "n" separate codes, which is inefficient. Hybrid variable length coding was recently introduced and includes coding a first region in the ordered sequence—the low-frequency region—differently than the coefficients in a second higher-frequency region. One embodiment of hybrid variable length coding uses a low-frequency coding method that takes advantage of the clustered nature of the quantized non-zero coefficients in the low-frequency region and a high-frequency coding method that takes advantage of the scattered nature of the quantized non-zero coefficients in the high-frequency region.

The position along the sequence where the coding method changes the low-frequency region coding method to the high-frequency region coding method is called the "breakpoint." One aspect of hybrid variable length coding is determining the location of the breakpoint that separates the one, e.g., low-frequency region from the other, e.g., high-frequency region. Such a breakpoint must be known to a decoder to properly decode the coded coefficients. A constant breakpoint for an entire video sequence has been found to be not optimal.

The Per Block Breakpoint Determining patent application describes methods for determining a breakpoint for each sequence of quantized transform coefficients for each block in an image frame. The Per Multi-Block Breakpoint Determining patent application describes multi-block methods for determining a single breakpoint for use for each block in a multi-point transition of adjacent blocks. Further improvements are possible by using the likelihood that there is correlation between some properties of sequences of quantized transform coefficients in spatially or temporally close blocks of image data.

SUMMARY

Embodiments of the present invention include a method, and apparatus, and logic encoded in one or more computer-readable tangible medium to carry out a method. The method is to code an ordered sequence of quantized transform coefficients of a block of image data using a hybrid coding method that includes determining a breakpoint location in the sequence between a low-frequency region and a high-frequency region; coding the low-frequency region using a selected low-frequency variable length coding method; coding the high-frequency region using a selected high-frequency variable length coding method; and coding the location of the breakpoint. The breakpoint location is determined as a function of properties of neighboring blocks such that little if any information needs to be sent to a decoder about the breakpoint of a block or multi-block partition, and the decoder can use the properties of neighboring blocks to determine the breakpoint used to code a to-be-decoded sequence or sequences of a block or a multi-block partition.

One embodiment includes a method comprising determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition. The method further includes encoding the ordered sequence of quantized transform coefficients of the block, or the ordered sequences of the multi-block partition, the encoding using hybrid variable length coding using the determined breakpoint. The method further includes, in the case information additional to the properties of the neighboring blocks would be needed by a decoder or decoding process to determine the determined breakpoint, encoding sufficient information about the relationship such that a decoder or decoding process can, prior to decoding the coded data of the block or multi-block partition use the sufficient information and the properties of the neighboring blocks to determine the breakpoint used to encode the coded data of the block or multi-block partition. The properties and the neighboring blocks are such that in the decoding, the properties of the neighboring blocks are known or determinable prior to the decoding of the coded data of the block or multi-block partition.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

Figure 1:
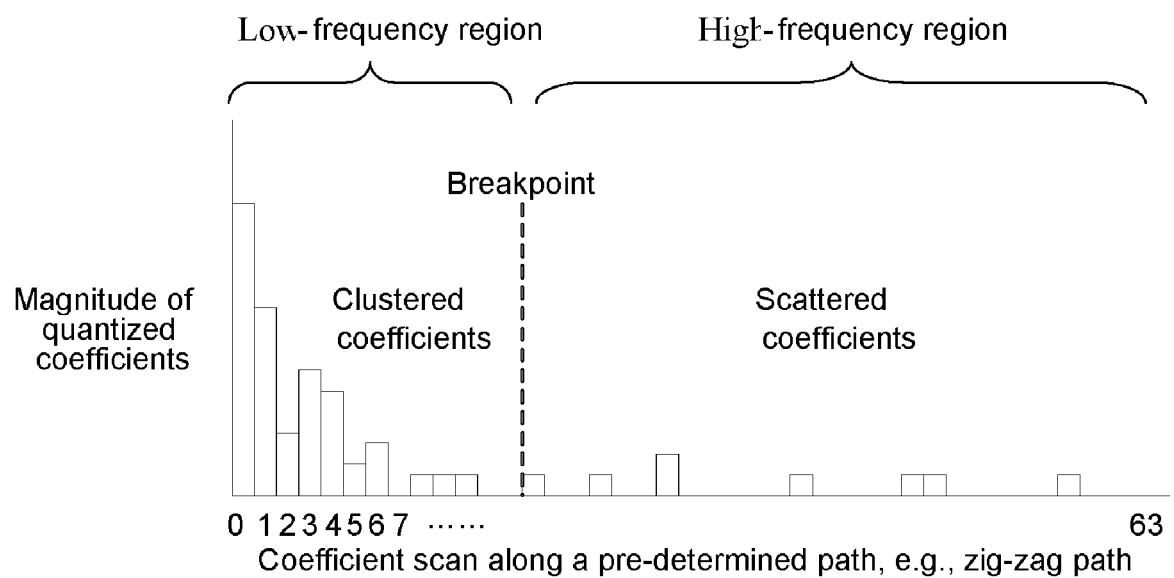
FIG. 1 shows a typical distribution of an ordered sequence of quantized coefficients of a transform block of image data.

In the description herein, it is assumed that a frame to be encoded is divided into blocks of image data. These blocks might be motion compensated, and a difference block might be determined after motion compensation. Each resulting block of image data is transformed by some transform, e.g., DCT or other transform. The coefficients are ordered, e.g., along the pre-determined path on the two-dimensional distribution, and then quantized. The description herein assumes that the quantization is to integer values that have sign and amplitude, and that zero is the most likely-to-occur amplitude, and 1 is the next most-likely-to-occur amplitude. Of course it is possible to quantize differently—the different quantized values are, after all, no more than labels that represent ranges of values. It would be straightforward for one in the art to modify the methods and techniques and apparatuses described herein to take into account other quantization schemes where zero is not the most likely-to-occur amplitude value, and/or 1 is not the next to most likely-to-occur amplitude value. The rest of this description therefore assumes, without loss of generality, that the ordered sequence of quantized coefficients has 0 as the most likely-to-occur amplitude value, and 1 as the next-to-most likely-to-occur amplitude value.

Conventional two-dimensional (2D) variable length coding (VLC), commonly adopted in image and video compression, is based on a run and amplitude level representation of an ordered sequence of quantized transform coefficients determined by ordering the coefficients along a pre-defined path, e.g., zigzag path for an N×N coefficient block. Such ordering is from low-frequency to high-frequency. Conventional two-dimensional variable length coding is therefore referred to as run-amplitude level variable length coding herein. Run-amplitude level variable length coding includes collecting or assuming statistics of non-zero coefficient amplitudes and of the number of zero-valued coefficients—the run-length of zeros that precede any non-zero amplitudes along the ordering of the sequence. A two-dimensional table consisting of the amplitude and the run-length is then constructed, and optimal variable length codes such as Huffman codes are assigned to represent the events in the table.

The advantage of run-amplitude level variable length coding is that the position of each non-zero-value coefficient and its amplitude are coded simultaneously as a pair, which results in a shorter average code length than coding the position and amplitude separately. In block-based transform coding, however, there are often a number of consecutive non-zero-value coefficients along the lower frequency region of the ordering of the sequence. Instead of using a single code to represent the "n" consecutive coefficients, run-amplitude level variable length coding requires "n" separate codes, which is inefficient. Hybrid variable length coding is known, and overcomes this deficiency. See, for example, U.S. patent application Ser. No. 10/869,229, filed 15 Jun. 2004 to inventors Chen, et al., published as US 20050276487, and titled "A HYBRID VARIABLE LENGTH CODING METHOD FOR LOW BIT RATE VIDEO CODING,". The elements disclosed therein are referred to collectively and individually herein as the "Basic Hybrid VLC Method." See also U.S. patent application Ser. No. 10/898,654, filed 22 Jul. 2004 to inventors Chen, et al., published as US 20050276497, and titled "AN EXTENDED HYBRID VARIABLE LENGTH CODING METHOD FOR LOW BIT RATE VIDEO CODING,". The elements disclosed in U.S. Ser. No. 10/898,654 are referred to collectively and individually as the "Extended Hybrid VLC Method" herein. See also U.S. patent application Ser. No. 10/922,508, filed 18 Aug. 2004 to inventors Toebes, et al., and titled "TWO-DIMENSIONAL VARIABLE LENGTH CODING OF RUNS OF ZERO AND NON-ZERO TRANSFORM COEFFICIENTS FOR IMAGE COMPRESSION,". The elements disclosed in U.S. Ser. No. 10/922,508 are referred to collectively and individually as the "2-D Non-Zero/Zero Cluster VLC Method" herein.

Hybrid coding can be extended to include more than two regions. However, for the remainder of this description, when speaking of a first and second region, it is assumed that there are two regions with a single breakpoint. The breakpoint determining is for this region between the first (low-frequency) region and the second (high-frequency) region.

FIG. 1 shows a typical distribution of an ordered sequence of quantized coefficients of a transform block of image data. As depicted in FIG. 1, the quantized non-zero coefficients in the low-frequency are likely to be more clustered than in the high-frequency region where non-zero coefficients are likely to be scattered. One embodiment of hybrid variable length coding uses coding methods that respectively take advantage of the clustered nature of the coefficients in the low-frequency region and the scattered nature of the quantized non-zero coefficients in the high-frequency region. In one embodiment, hybrid variable length coding uses two types of position coding schemes. In one embodiment of hybrid variable length coding, in the low-frequency region, runs of consecutive zero-valued coefficients and runs of consecutive non-zero-valued coefficients are coded as a pair using a two-dimensional variable length coding table. In one embodiment of hybrid variable length coding, the amplitudes of the non-zero-valued coefficients are then coded by an independent, one-dimensional variable length coding table. In the high-frequency region, run-amplitude level variable length coding or a similar two-dimensional variable length coding scheme is retained to code the position and amplitude of each non-zero-valued coefficient as a pair.

The switching position between the low-frequency and high-frequency coding schemes is termed a "breakpoint", which must be known to the decoder to properly decode the coefficients. Determining or pre-selecting a breakpoint is required for the coding using hybrid variable length coding, and how this is determined can make a difference to the achieved coding efficiency. On one hand, given the low-frequency and high-frequency coding schemes, there exists an optimal breakpoint within each block of coefficients, which results in the minimum number of bits in the coded coefficients. On the other hand, this optimal breakpoint varies among blocks and therefore needs to be included in the bitstream, which may introduce a considerable overhead if it is not efficiently coded. We have studied hybrid variable length coding using a constant breakpoint for the entire video sequence, and found that a single constant breakpoint, while leading to reasonable performance, is not optimal.

Different methods and approaches are described herein for performing hybrid variable length coding with variable breakpoints. These approaches generally include two elements: a method to find a proper breakpoint for at least one block of coefficients, and a method to code the breakpoint in an explicit or implicit fashion. The details of different embodiments of these approaches are described herein below.

In the remainder of this description, unless otherwise noted, it is assumed that a method that combines a two-dimensional position coding scheme with a one-dimensional amplitude (2DP1DA) coding scheme, e.g., 2-D Non-Zero/Zero Cluster VLC Method as described in U.S. Ser. No. 10/922,508 is used for coding the low-frequency coefficients, while conventional run-amplitude level variable length coding is used for coding the high-frequency coefficients. Note that in 2DP1DA, 2DP means two-dimensional position coding, and 1DA means one-dimensional amplitude. Furthermore, the DC value in of the transform of the block of image data is assumed to be encoded separately, so that only the AC coefficients are included. Note that the methods described herein are not limited to using a 2DP1DA coding scheme, and are generally applicable to any alternative low-frequency coding scheme and any alternative high-frequency coding scheme, with or without modifications, and also to encoding the DC value with the remainder of the quantized coefficients. For example, in addition to convention two-dimensional variable length coding, the following provide alternate methods for the different, e.g., low-frequency and/or high-frequency regions, and those in the art will understand if and how to modify and incorporate the methods described therein for the low-frequency and/or high-frequency methods:

U.S. patent application Ser. No. 10/439,536 filed 16 May 2003 to inventors Chen et al, titled VARIABLE LENGTH CODING METHOD AND APPARATUS FOR VIDEO COMPRESSION, and published as US 20040228540.

U.S. patent application Ser. No. 10/342,537 filed 15 Jan. 2003 to inventors Chen et al, titled AN EXTENSION OF TWO-DIMENSIONAL VARIABLE LENGTH CODING FOR IMAGE COMPRESSION.

U.S. patent application Ser. No. 10/440,595 filed 19 May 2003 to inventors Chen et al, titled AN EXTENSION OF TWO-DIMENSIONAL VARIABLE LENGTH CODING FOR IMAGE COMPRESSION.

U.S. patent application Ser. No. 10/869,229 filed 15 Jun. 2004 to inventors Chen et al, titled A HYBRID VARIABLE LENGTH CODING METHOD FOR LOW BIT RATE VIDEO CODING, and published as US 20050276487.

U.S. patent application Ser. No. 10/898,654 filed 22 Jul. 2004 to inventors Chen et al, titled AN EXTENDED HYBRID VARIABLE LENGTH CODING METHOD FOR LOW BIT RATE VIDEO CODING and published as US 20050276497.

U.S. patent application Ser. No. 10/910,712 filed 3 Aug. 2004 to inventors Chen et al, titled VIDEO COMPRESSION USING MULTIPLE VARIABLE LENGTH CODING PROCESSES FOR MULTIPLE CLASSES OF TRANSFORM COEFFICIENT BLOCKS and published as US 20050276498.

U.S. patent application Ser. No. 10/922,508 filed 18 Aug. 2004 to inventors Toebes et al, titled TWO-DIMENSIONAL VARIABLE LENGTH CODING OF RUNS OF ZERO AND NON-ZERO TRANSFORM COEFFICIENTS FOR IMAGE COMPRESSION and published as US 20060039621.

U.S. patent application Ser. No. 10/922,507 filed 18 Aug. 2004 to inventors Chen et al, titled VIDEO CODING USING MULTI-DIMENSIONAL AMPLITUDE CODING AND 2-D NON-ZERO/ZERO CLUSTER POSITION CODING and published as US 20060039620.

U.S. patent application Ser. No. 11/069,622 filed 28 Feb. 2005 to inventors Chen et al, titled AMPLITUDE CODING FOR CLUSTERED TRANSFORM COEFFICIENTS and published as US 20060039616.

U.S. patent application Ser. No. 11/069,621 filed 28 Feb. 2005 to inventors Chen et al, titled JOINT AMPLITUDE AND POSITION CODING FOR PHOTOGRAPHIC IMAGE AND VIDEO CODING and published as US 20060039615.

U.S. patent application Ser. No. 11/069,620 filed 28 Feb. 2005 to inventors Chen et al, titled ADAPTIVE BREAKPOINT FOR HYBRID VARIABLE LENGTH CODING and published as US 20050276499.

U.S. patent application Ser. No. 11/270,138 filed 9 Nov. 2005 to inventors Chen et al, titled EXTENDED AMPLITUDE CODING FOR CLUSTERED TRANSFORM COEFFICIENTS and published as US 20060056720.

U.S. patent application Ser. No. 11/385,183 filed 20 Mar. 2006 to inventors Chen et al, titled VARIABLE LENGTH CODING FOR CLUSTERED TRANSFORM COEFFICIENTS IN VIDEO COMPRESSION.

U.S. patent application Ser. No. 11/346,757 filed 3 Feb. 2006 to inventors Chen et al, titled VARIABLE LENGTH CODING FOR SPARSE COEFFICIENTS.

The contents of each of the above patent applications are incorporated herein by reference.

Two-Dimensional Position and One-Dimensional Amplitude Coding (2DP1DA)

For completeness, an example of 2DP1DA is included. Encoding the low-frequency region coefficients includes recognizing events—position events—describable by one or more parameters, such as the run-lengths of zero value coefficients, run-lengths of non-zero-amplitude coefficients, amplitudes, signs, and so forth. These parameter(s) are encoded, e.g., by a lookup device to look up appropriate one or more lookup tables.

One embodiment of two-dimensional (2D) variable length coding jointly encodes 2D position events (2DP events) that include any run of consecutive zero-valued coefficients preceding a run of non-zero-valued coefficients. No such preceding run of zero-valued coefficients is indicated by a run-length of 0. So jointly encoding events by a 2D variable length code is found to be, on average, more efficient, for example, than encoding the same events by two independent 1D variable length codes.

In one embodiment, a single zero immediately following each non-zero coefficient cluster is included as part of the 2DP event. This effectively reduces the run-length of the zero-valued coefficients by 1 and the dimension representing run-lengths of zero-valued coefficients will start from 0 instead of 1.

Thus, one embodiment of encoding the low-frequency region of a sequence of coefficients includes two-dimensional position coding to encode events that include any run of zero-valued coefficients preceding a run of non-zero-valued coefficients, and encoding amplitude events using one-dimensional amplitude coding for the non-zero-amplitudes in the runs. No immediately preceding run of zeroes is indicated by a run-length of zero.

The inventors have found that extending the 2D position events can be extended to include the "last" information representing the end of the block. Using two-dimensional position and one-dimensional amplitude coding, consider the sample coefficient sequence:

2 3 2-1-1 0 0 1-1 1

This is encoded as:

$C_p(0, 5, 0) \ C_A(2) \ S(0) \ C_A(3) \ S(0) \ C_A(2) \ S(0) \ C_A(1) \ S(1) \ C_A(1) \ S(1) \ C_p(1, 3, 1) \ C_A(1) \ S(0) \ C_A(1) \ S(1) \ C_A(1) \ S(0)$ where $C_p$(zrun, nzrun, last) denotes the 2D position code of an identified event. Note that in the above stream of codewords, the second position code is "$C_p(1, 3, 1)$" rather than "$C_p(2, 3, 1)$" because the first zero coefficient has been implicitly included in the first position event coded as $C_p(0, 5, 0)$.

While such 2D position coding is anticipated to provide on average improved coding efficiency over two 1D position coding, the size of the code table used is increased. For an 8×8 block, i.e., 64 coefficients along the scan path, the total size of a 2-D code table is roughly 2×63×64=8K, including accounting for the last information. In practice, to reduce the table size, events that are relatively unlikely to appear may be coded by an "Escape" code followed by fixed numbers of bits, which indicate the runs of zero- and non-zero-valued coefficients as well as the last information.

Method to Determine a Breakpoint Per Block

The above-cited incorporated by reference Per Block Breakpoint Determining patent application describes a method that includes, for a plurality of blocks of image data and a respective ordered sequence of quantized transform coefficients in each block, and for a pre-selected low-frequency coding method and a pre-selected high-frequency coding method, determining a breakpoint for each block. The pre-selected low-frequency coding method includes recognizing any event that includes a cluster of coefficients having respective amplitudes other than the most likely-to-occur amplitude, e.g., non-zero amplitudes, and recognizing amplitude events, or in other embodiments, recognizing joint position and amplitude events that each includes a cluster of coefficients. One embodiment includes for each block determining a set of possible breakpoints, each defined by an ending event recognized by the low-frequency coding method, and the number of bits that would result from using the possible breakpoint by coding a first part of the sequence up to and including the ending event using the low-frequency coding method, and coding a second part of the sequence from the quantized coefficients immediately following the ending event. In one embodiment, the set of possible breakpoints and resulting numbers of bits are obtained by a first pass coding method and a second pass coding method. The first pass coding process includes encoding the ordered sequence using the selected low-frequency variable length coding method. The first pass coding process starts from the lowest-frequency (AC) quantized coefficient. In one embodiment, in order to be able to determine the numbers of bits used for the encoding, a data structure, e.g., a table is constructed for different locations of the ending event and tabulating the number of bits required to encode the portion of the sequence up to the ending event. In one example low-frequency coding method, position events include a run of any zero-valued coefficients that end in a single zero-valued coefficient. In one embodiment, a data structure is maintained that records three quantities for each ending event location that is coded by 2D position coding: the starting position of the event, e.g., starting with a position 0, the ending position of the event, and the accumulated number of bits that has been consumed to code the coefficients up to and including the ending event.

A second pass coding process includes encoding the sequence of the blocks using the selected high-frequency variable length coding method to determine the number of bits to encode different parts of the sequence each different part starting from after respective different ending event locations from the low-frequency method. In one embodiment, the selected high-frequency variable length coding method is performed in a reverse order starting from the non-zero-value coefficient that has the highest frequency index. In one embodiment, the accumulated number of bits of coding each part between the end and each ending event used in the low-pass coding first pass is noted. Once the coding process reaches an ending position that was recorded in the first pass using the low-frequency coding method, the method adds the accumulated number of bits consumed by the high-frequency method, in this case the run-amplitude level variable length coding to the corresponding entry from the first pass in the table.

Thus, in one embodiment, the second pass includes noting the total number of bits to encode the whole sequence for different ending events, the sequence encoded from the start to the ending event by the low-frequency method and from after the ending event by the selected high-frequency coding method.

One embodiment of the per block method further includes comparing the total number of bits to encode the whole sequence for different ending event locations for events recognized in the first pass encoding, the total number of bits being the number of bits resulting from the first pass encoding to encode a first part of the sequence up to and including the ending event, and the number of bits resulting from the second pass encoding to encode a second part of the sequence starting from after respective different ending events.

One embodiment of the per block method further includes selecting as a final ending event the ending event that results in the least total number of bits in the comparing.

One method embodiment further includes encoding the sequence by encoding a first portion of the sequence up to and including the final ending event using the selected low-frequency variable length coding method and encoding a second portion of the sequence from the first coefficient after the final ending event to the end of the sequence using the selected high-frequency variable length coding method.

In one embodiment, the per block breakpoint found is a "soft" breakpoint in that it defines a position that the breakpoint is at the end of an event—the final ending event—coded by the low-frequency coding method. One embodiment of the per block method further includes encoding the location of the final ending event that defines the breakpoint, e.g., using a variable length coding method. One version encodes each breakpoint separately, while another method includes coding the breakpoints of a multi-block partition jointly using a multi-dimensional variable length coding method. An individual breakpoint can be coded by any indication of a location in the sequence between the starting position and the ending position of the final ending event coded by the low-frequency coding scheme, e.g., by a frequency index between the index values of the start and end of such final ending low-frequency event. Alternately, encoding the optimal breakpoint value includes encoding a number representing the ordinal value of the final ending event that is coded by low-frequency coding method, in other words, an index representing which of the ending events is the final ending event, e.g., the index 1 if the final ending event is the first ending event, the index 2 if the final ending event is the second ending event, and so forth.

Using a Single Breakpoint Per Multi-Block Partition

Figure 2A:
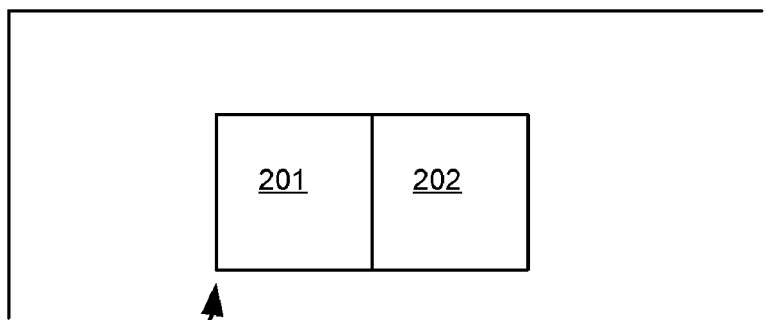
FIG. 2A shows an illustration of a 1-block by 2-block superblock for the sequences of quantized transforms coefficients of two blocks.
Figure 2B:
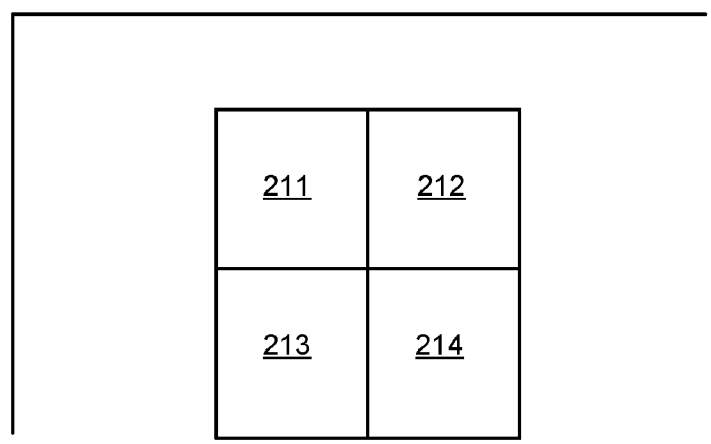
FIG. 2B shows an illustration of a 2-block by 2-block superblock for the sequences of quantized transforms coefficients of four blocks.
Figure 2C:
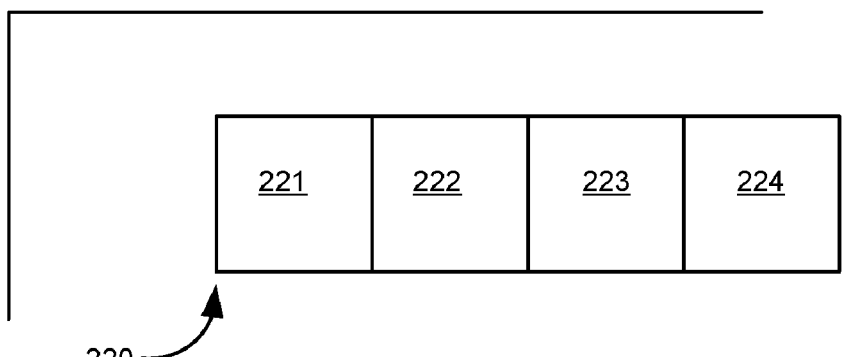
FIG. 2C shows an illustration of a 1 block by 4 block superblock for the sequences of quantized transforms coefficients of four blocks.

Consider a partition of adjacent blocks. Denote by $N_B$ the number of blocks in the partition. While these adjacent blocks can be for a partition of any shape, in some embodiments of the invention, a partition of adjacent blocks that is rectangular is selected, in that the $N_B$ blocks form what we call a "superblock" of $N_{B1}$ blocks by $N_{B2}$ blocks, where $N_B = N_{B1} \times N_{B2}$. FIG. 2A shows an illustration of such a 1-block by 2-block partition 205 of blocks 201 and 202. FIG. 2B shows an illustration of another partition—a 2-block by 2-block partition 210 of blocks 211, 212, 213, and 214. FIG. 2C shows an illustration of another 4-block partition, a 1 block by 4 block partition 220 of four blocks 221, 222, 223, and 224 of image data. Similarly, partitions can be formed for more than 4 blocks. Note that while some of the blocks are adjacent, not all blocks are adjacent is what we call a partition of a plurality of adjacent blocks. For example, in FIG. 2C, clearly block 221 is not adjacent to block 224.

Consider a multi-block partition. The Per Block Breakpoint Determining patent application describes methods for determining and using a single breakpoint to use for the whole multi-block partition.

The inventors have found that using such a single breakpoint for a multi-block partition typically provides improved compression efficiency for hybrid variable length coding compared to using a single breakpoint for all blocks in an image.

Some embodiments of the present invention also use a single breakpoint for the whole multi-block partition.

Note that there may be some blocks that have only zero-valued coefficients. Such blocks are not coded. Modern coders typically include an indication in the coded bitstream, e.g., in a header sent for a block indicative of whether the block has only zero valued coefficients.

Context-Based Breakpoints

The inventors observed that in block-based image and video coding, spatially or temporally adjacent blocks have correlated context and coefficient distributions. For example, the ordered sequence of quantized transform coefficients of a block will have a larger probability to contain non-zero coefficients if the sequences of its neighboring, e.g., adjacent blocks have non-zero coefficients than if those sequences of neighboring, e.g., adjacent blocks have only zero-valued coefficients.

The incorporated-by-reference Per Block Breakpoint Determining patent application and Per Multi-Block Breakpoint Determining patent application disclose how to determine breakpoints, and how to encode those determined breakpoints. However, there is incentive to reduce the amount of overhead required to transmit the encoded breakpoints.

Embodiments of the present invention include encoding not the breakpoint values themselves, but rather, for a particular block or multi-block partition, a relationship that would allow a decoder to determine the breakpoint that was used to encode the sequence or sequences of the particular block or multi-block partition, such that a decoder receiving the encoded information, can determine the breakpoint to carry out decoding.

Embodiments of the present invention include method embodiments that use properties of neighboring, e.g., adjacent blocks to determine and/or encode (or decode) the breakpoint of a particular block or multi-block partition. The properties are such that they are known or determinable at the time when the particular block or multi-block partition is being encoded (or decoded). For example, the sequences of the neighboring, e.g., adjacent blocks may have been coded and the properties related to information obtained in the process of coding, or, at the decoding, the sequences of the neighboring, e.g., adjacent blocks may have been decoded and then re-encoded to determine the properties.

Note that while the description herein focuses mostly on spatially adjacent blocks, modifying the methods to use the correlation between temporally adjacent blocks would be straightforward, e.g., following the same logic as described herein below. Furthermore, while the embodiment described herein use properties of immediately (spatially and/or temporally) adjacent blocks, the methods can readily be modified to use properties of next to immediately adjacent blocks, and therefore, the invention is not meant to be limited to only spatially adjacent or only immediately spatially adjacent, or only temporally adjacent, or only temporally immediately adjacent blocks, but in general neighboring blocks. The term adjacent is not to be understood as immediately adjacent except when it clearly means immediately adjacent, as in the examples in some of the drawings. How to modify any method described herein to include or substitute one or more of these alternate features would be straightforward to those in the art from the description herein, so does not require further detailed description for enablement.

Figure 3:
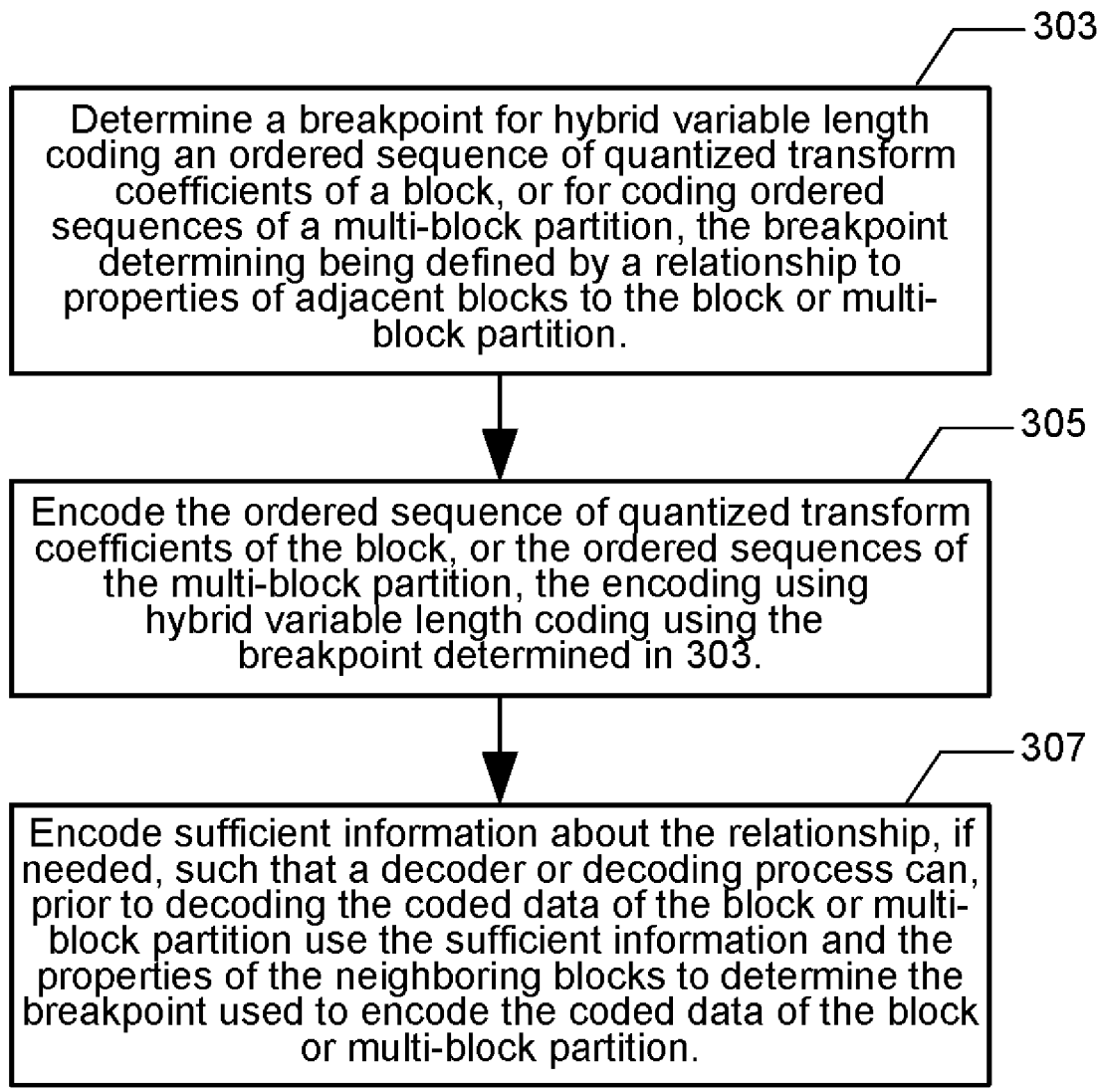
FIG. 3 shows a simplified flowchart of one embodiment of a method that includes determining a breakpoint.

FIG. 3 shows a simplified flowchart of one method embodiment of the invention. Step 303 includes determining a breakpoint for hybrid variable length coding an ordered sequence of quantized transform coefficients of a block, or for hybrid variable length coding ordered sequences of a multi-block partition, the breakpoint determining being defined by a relationship to properties of blocks neighboring, e.g., immediately adjacent to the block or multi-block partition.

Step 305 includes encoding the ordered sequence of quantized transform coefficients of the block, or the ordered sequences of the multi-block partition, the encoding using hybrid variable length coding using the breakpoint determined in 303.

Step 307 includes encoding sufficient information about the relationship that defines the breakpoint so that a decoder, prior to decoding the coded data of the block or the multi-block partition, can determine the breakpoint to use for decoding the coded data of the block or multi-block partition from the decoded information and from the properties of the neighboring, e.g., immediately adjacent blocks to the block or multi-block partition. Note that in many embodiments, sufficient information is no information about the relationship; the decoder knows how to determine the breakpoint from the properties of the neighboring, e.g., immediately adjacent blocks without receiving any explicit information.

The properties of the neighboring, e.g., immediately adjacent blocks are known or determinable prior to the coding of the sequence of the block or sequences of the multi-block partition. Furthermore, for the case of decoding, the properties of the neighboring, e.g., immediately adjacent blocks are known or determinable prior to decoding of the codewords that result from coding the sequence or sequences. Step 307 includes either no information or encodes sufficient information rather than encoding the breakpoint value. Thus, once a decoder has decoded the information, the decoder can apply the relationship to the properties of the neighboring, e.g., immediately adjacent blocks to determine the breakpoint to use for decoding.

The relationship is such that sufficient information about the relationship can be encoded in no or relatively few bits, e.g., using a variable length code. In several embodiments, no bits are required to encode the relationship.

By the "context" of a to-be-coded block or multi-block partition is meant the neighboring, e.g., immediately adjacent, blocks. In one embodiment, the context of a to-be-coded block or multi-block partition includes the already coded neighboring, e.g., immediately adjacent blocks. Assuming a top-to-bottom, left-to-right raster order of coding (or decoding), FIG. 4A and FIG. 4B respectively show spatially immediately adjacent blocks to a to-be-coded (or decoded) block, and spatially adjacent blocks to a to-be-coded (or decoded) multi-block partition. A relationship to one or more properties of such spatially adjacent blocks is used on embodiments of the invention and is used to determine the breakpoint to use to code (or decode) the to-be-coded (or to-be-decoded) block or multi-block partition. In the scenario shown in FIG. 4A, applicable to a per block breakpoint determining method, consider a subject block 401. Adjacent blocks 402 and 403 are both adjacent and already coded (or decoded) assuming a left-to-right top-to-bottom raster coding (or decoding) order, and so are regarded as the neighboring context of the subject block 401. In the scenario shown in FIG. 4B, applicable to a per block breakpoint determining method, for a subject multi-block partition, say a superblock that includes blocks 411, 412, 413 and 414, blocks 416, 417, 418, and 419 are both adjacent and already coded (or decoded) assuming a left-to-right top-to-bottom raster coding (or decoding) order, so are considered as the neighboring context of the subject four-block partition.

Figure 4A:
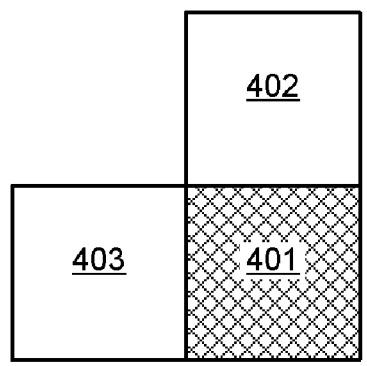
FIG. 4A and FIG. 4B respectively show spatially immediately adjacent blocks to a to-be-coded (or decoded) block, and spatially adjacent blocks to a to-be-coded (or decoded) multi-block partition, and used to illustrate embodiments of the present invention.
Figure 4B:
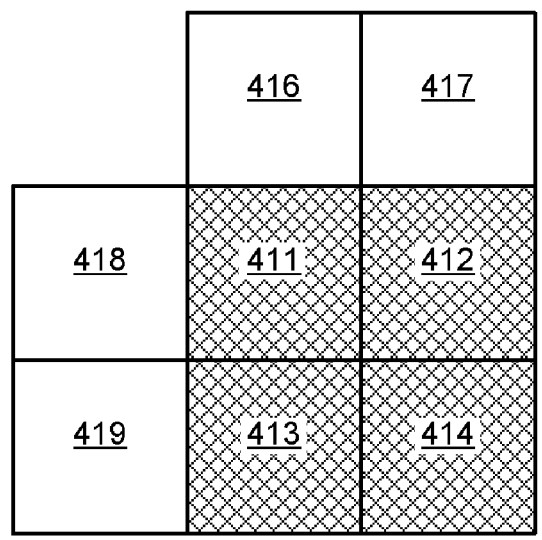

To generalize what is shown in FIGS. 4A and 4B for a selected coding and decoding order, e.g., an order possible other than a top-to-bottom, left-to-right raster order, for a particular block or multi-block partition, the neighboring blocks of the context are the immediately adjacent blocks that are vertically and horizontally adjacent to the particular block or multi-block partition and whose properties are known or determinable at the time of coding or decoding for the coding and decoding order. For example, these would be those that are immediately below and immediately to the right in a bottom-to-top, right-to-left coding and decoding order.

Different embodiments may include more or fewer blocks in the context. For example, in the example scenario shown in FIG. 5 applicable to a per block breakpoint determining method. Suppose the subject to-be coded (or decoded) block is block 501. In an alternate embodiment, blocks adjacent blocks 502, 503, 504, and 505 are both adjacent, in this case including diagonal adjacency, and already coded (or decoded) assuming a left-to-right top-to-bottom raster coding (or decoding) order, and so in such an alternate embodiment, are regarded as in the neighboring context of the subject block 501.

Properties of the Context

Different embodiments of the invention use different properties of the neighboring, e.g., immediately adjacent blocks to determine the breakpoint to use to encode a sequence of a block or sequences of a multi-block partition via a relationship. These properties typically have to do with the coefficient distributions in the neighboring, e.g., immediately adjacent blocks.

In one embodiment, the properties related to neighboring, e.g., immediately adjacent blocks include the optimal breakpoints of the sequences of quantized transform coefficients of the neighboring, e.g., immediately adjacent blocks.

In one embodiment, relatively coarse properties are used, e.g., whether or not the sequences of quantized transform coefficients of the neighboring, e.g., immediately adjacent blocks have any non-zero valued quantized transform coefficients.

In one embodiment, relatively finer properties are used, e.g., for at least some neighboring, e.g., immediately adjacent block whose sequence includes non-zero-valued coefficients, whether or not the optimal breakpoint for the sequences of quantized transform coefficients of the neighboring, e.g., immediately adjacent blocks are greater than zero. A zero-valued optimal breakpoint means that only the selected high-frequency coding method is used to encode the whole sequence.

In one embodiment, the properties related include for at least some neighboring, e.g., immediately adjacent block whose sequence include non-zero-valued coefficients, whether or not the second half of the sequence of quantized transform coefficients of the neighboring, e.g., immediately adjacent block has any non-zero valued quantized transform coefficients.

In one embodiment, other properties about non-zero-valued coefficients are used, e.g., for each neighboring, e.g., immediately adjacent block, the number of non-zero valued quantized transform coefficients in the sequence of quantized transform coefficients of the neighboring, e.g., immediately adjacent block.

Each of these properties can be easily obtained once a neighboring block is encoded (or decoded). In a decoder, for example, that is operative to decode a bitstream from an encoder, the properties may require the decoder to decode then re-encode the decoded sequence of the neighboring block. Such is the case, for example, if one property is the optimal breakpoint for the block, and other than the optimal breakpoint of the block was used by the encoder coding end to encode the block.

Using the Optimal Breakpoint of Neighboring Blocks.

One embodiment uses as the properties of the context used to determine the breakpoint to encode a block or multi-block the optimal, soft hybrid variable length coding breakpoints of one or more previously encoded (or decoded) blocks that neighbors, e.g., are immediately adjacent to the subject to-be-encoded block or multi-block partition. As described in the incorporated-by-reference Per Block Breakpoint Determining patent application, each soft breakpoint can be represented by a range of coefficient indices that define an ending event recognized by the selected low-frequency variable length coding method, and that includes a cluster of one or more non-zero-valued coefficients. Consider a block denoted X, and denote the starting and ending positions of the range of the optimal breakpoint by $N_{start}(X)$ and $N_{end}(X)$, respectively. The range of the optimal breakpoint is thus $[N_{start}(X), N_{end}(X)]$, and also represents the range of the ending event that includes a cluster of one or more non-zero quantized coefficients recognized by the selected low-frequency coding method. That is, the optimal breakpoint is any arbitrary coefficient index denoted $N_{opt}(X)$ in the range, so that $$N_{start}(X) \leq N_{opt}(X) \leq N_{end}(X).$$

Note that for selected low-frequency and high-frequency variable length coding methods, the optimal breakpoint for the ordered sequence of quantized transform coefficients of a block of coefficients solely depends on the quantized coefficient distribution of the sequence of the block and can be calculated from the coefficients using the method described in the Per Block Breakpoint Determining patent application.

At the coder, it should be noted that the breakpoint actually used for coding the neighboring block that is part of the context may differ from its optimal breakpoint. For instance, the actual used breakpoint may be an estimate of the optimal breakpoint using a method such as described in the Per Multi-Block Breakpoint Determining patent application, or some other approximation method, including those described herein. However, the optimal breakpoint is determinable from the quantized coefficient distribution of the sequence of the block. At the decoder, for example, decoding a neighboring block provides a decoded sequence of the block that can then be used to determine the optimal breakpoint of the neighboring block.

Hereinafter, denote the actual breakpoint used for a sequence of a block X by N(X). In one embodiment, N(X) is defined by a relationship to properties of neighboring, e.g., immediately adjacent blocks. One embodiment encodes or assumes information about the relationship rather than encoding the value of N(X). To properly decode the codewords for a block X, a decoder must know or determine N(X), e.g., using the decoded relationship and the properties of the neighboring, e.g., immediately adjacent blocks following the same process as on the encoding side. To determine such properties, the decoder might at least partially re-encode the sequences of blocks that are neighbors to, e.g., immediately adjacent to block X. For example, in the case of the properties being the optimal breakpoint, once a block is decoded at the decoder, its optimal soft breakpoint, or more explicitly, the two positions $N_{start}(\ )$ and $N_{end}(\ )$, can be obtained by performing methods such as those described in the incorporated-by-reference Per Block Breakpoint Determining patent application.

Using Differential Encoding as the Relationship

One embodiment includes differentially encoding the breakpoint of the subject block(s) by determining the difference or differences between the breakpoint to use for the subject block(s) and the optimal breakpoints of the neighboring, e.g., immediately adjacent blocks, and encoding the difference(s) so that a decoder can determine the difference(s) and then the breakpoint of the subject block.

Using Context One Breakpoint Per Block

For the example block distribution shown in FIG. 4A, suppose block 402 is denoted as block A, and block 403 is denoted as block B. The subject block 401 is denoted as X. One embodiment include using a breakpoint denoted N(X) for block X as one of the following four relationships to optimal breakpoints, depending on availability of the optimal breakpoints of A or B or both: 0, $N_{opt}(A)$, $N_{opt}(B)$, or $[N_{opt}(A)+N_{opt}(B)]/2$. $N_{opt}(A)$ is a pre-defined coefficient position between $N_{start}(A)$ and $N_{end}(A)$. For example, in one embodiment, $N_{opt}(A)=N_{start}(A)$. While encoding which of these four relationships to optimal breakpoints might require 2 bits to encode, in one embodiment, the coder or decoder knows which of these relationships to optimal breakpoints to use according to whether or not the adjacent block A's optimal breakpoint is available, and whether or not the adjacent block B's optimal breakpoint is available. For example, for the top row of blocks in a frame, the immediately above neighbor would not be available since there is no immediately above neighbor for the top row. Therefore, no bits are required to encode the relationship of the breakpoint of the subject block X to the immediately adjacent neighbor's respective optimal breakpoints.

The following pseudocode describes one embodiment, called "Sample Strategy 1" of such a method of determining the breakpoint N(X) with no bits used to encode the relationship:

```
% Sample strategy 1:
    If (block A is unavailable and block B is unavailable)
        N(X) = 0
    Else If (block B is unavailable)
        N(X) = N_opt(A)
    Else If (block A is unavailable)
        N(X) = N_opt(B)
    Else If (N_opt(A) == N_opt(B))
        N(X) = N_opt(A)
    Else
        N(X) = [N_opt(A)+N_opt(B)]/2
```

Usually, except from frame edge blocks, both $N_{start}(A)$ and $N_{end}(A)$ are available at the time when block X is encoded. No overhead is needed in the bitstream providing the breakpoint for the stream. On the decoding side, the decoder can derive N(X) by finding $N_{start}(A)$ and $N_{end}(A)$ to define $N_{opt}(A)$ for the adjacent block A, presumed previously decoded, and by finding $N_{start}(B)$ and $N_{end}(B)$ to define $N_{opt}(B)$ of adjacent block B, again presumed previously decoded.

Figure 5:
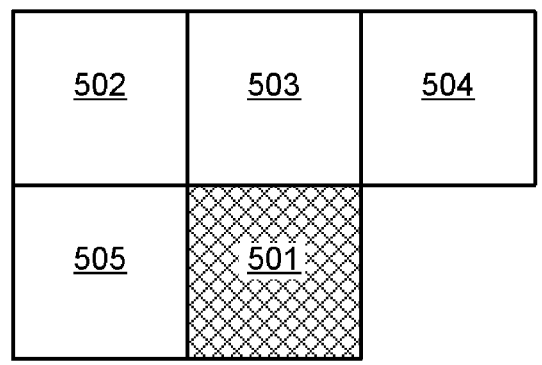
FIG. 5 shows an alternate arrangement of more blocks used as neighboring blocks than the example of FIG. 4A.

A similar embodiment can be used when more blocks are used for the context. for example, for the situation shown in FIG. 5, suppose the neighboring blocks 502, 503, 504, and 505 are denoted by A, B, C, and D, respectively, while subject block 501 is denoted by X. Then one embodiment uses the average of $N_{opt}(A)$, $N_{opt}(B)$, $N_{opt}(C)$, and $N_{opt}(D)$, depending on which block's data is available, so that $$N(X)=[N_{opt}(A)+N_{opt}(B)+N_{opt}(C)+N_{opt}(D)]/4$$

in the case the optimal breakpoints of A, B, C, and D are available.

Another embodiment applicable to the situation of FIG. 5 uses a weighted average, and weights the diagonally adjacent blocks A (502) and C (504) less than the immediately adjacent blocks B (503) and D (505). For example, assuming all blocks' optimal breakpoints are available, $$N(X)=[2N_{opt}(A)+3N_{opt}(B)+2N_{opt}(C)+3N_{opt}(D)]/10$$

Other weightings are of course possible in other embodiments.

Thus, one embodiment in which the properties related to neighboring blocks used to determine that breakpoint are the optimal breakpoints of the sequences of quantized transform coefficients of the neighboring blocks, the breakpoint is the average of any of the neighboring blocks that are available assuming a coding and decoding order, e.g., a top to bottom rows of left to right raster ordering.

Returning to the situation of FIG. 4A, another embodiment includes using a breakpoint denoted N(X) for block X that is either $N_{opt}(A)$ or $N_{opt}(B)$, depending on which would lead to the shorter bitstream for itself, that is, determining on which of nbits opt(A)) or nbits($N_{opt}(B)$ is smaller, where nbits(N) is the number of bits in the encoded bitstream when coding a block with a breakpoint value of N. The method includes encoding which of the adjacent block's optimal breakpoint defines the breakpoint, e.g., using a 1-bit header to encode the relationship, i.e., to indicate which of the adjacent block's optimal breakpoint value is being used. The following pseudocode describes such an embodiment, called "Sample strategy 2":

```
&Sample strategy 2:
    If (block A is unavailable and block B is unavailable)
        N(X) = 0
    Else If (block B is unavailable)
        N(X) = N_opt(A)
    Else If (block A is unavailable)
        N(X) = N_opt(B)
    Else If (N_opt(A) == N_opt(B))
        N(X) = N_opt(A)
    Else If (nbits(N_opt(A)) <= nbits(N_opt(B)))
        N(X) = N_opt(A)       //indicated in the bitstream by a bit '1'
    Else
        N(X) = N_opt(B)       //indicated in the bitstream by a bit '0'
```

Using Context to Determine One Breakpoint Per Multi-Block Partition

Consider the example block layout shown in FIG. 4B. Without using context, breakpoint to use for the present multi-block partition of blocks 411-414 can be found by using the per multi-block method described in the incorporated-by-reference Per Multi-Block Breakpoint Determining patent application. Without using context, the breakpoint to use for the multi-block partition is encoded using a variable length coding method, e.g., using a variable length coding table. In some embodiments described in the incorporated-by-reference Per Multi-Block Breakpoint Determining patent application, different variable length coding tables are constructed for coding the optimal breakpoint of the multi-block partition, in correspondence to the cases where there are different numbers of blocks in the multi-block partition that have non-zero coefficients.

Note that there may be some blocks that have only zero-valued coefficients. Such blocks are not coded. Modern coders typically include an indication in the coded bitstream, e.g., in a header sent for a block indicative of whether the block has only zero valued coefficients.

One embodiment uses this information together with properties of neighboring, e.g., immediately adjacent blocks to determine the single breakpoint to use for the multi-block partition. This may reduce the average number of coded bits needed to encode the breakpoint.

That is, one embodiment includes encoding for each respective block in the to-be-coded multi-block whether or not the block has any non-zero coefficients. The breakpoint determining uses this information of whether there are any non-zero coefficients for each respective block in the partition, such that an encoder, prior to determining the breakpoint used to encode a multi-block partition, has information for each respective block in the multi-block partition on whether or not the block has any non-zero coefficients.

Figure 6A:
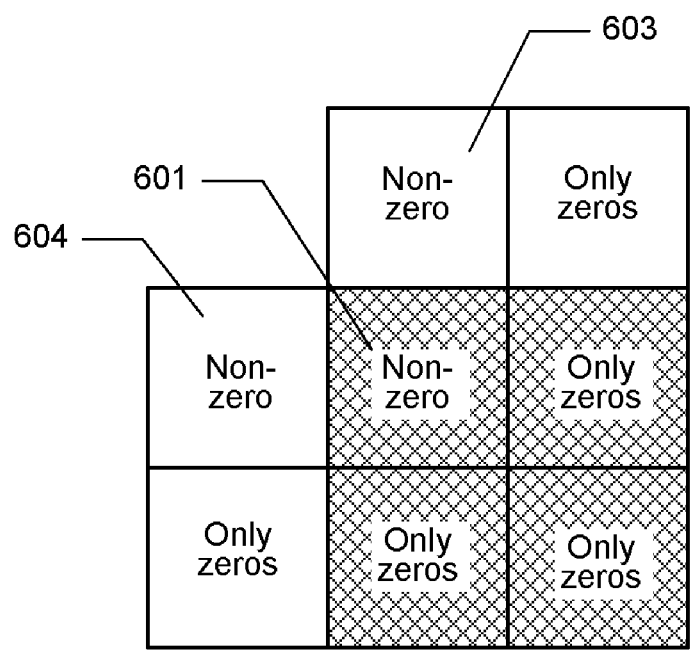
FIGS. 6A and 6B show respective examples of a multi-block partition and adjacent blocks thereof, and used to illustrate embodiments of the present invention.
Figure 6B:
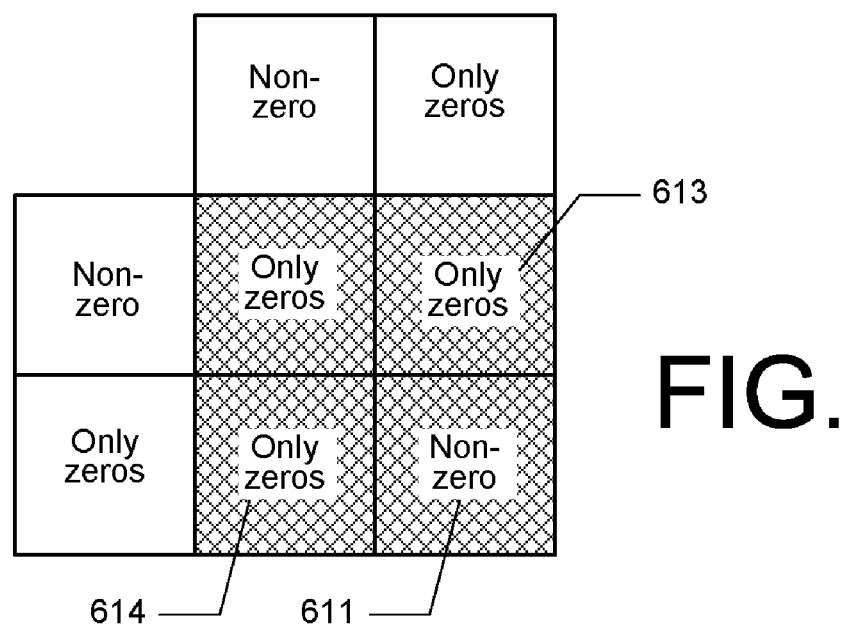

FIGS. 6A and 6B show respective examples of a multi-block partition and adjacent blocks thereof. In both FIGS. 6A and 6B, there is only one block 601, 611, respectively, in the to-be-coded multi-block partition that has any non-zero quantized coefficients, such one block 601, 611 marked by "Non-zero." However, the non-zero block is at different locations relative to other non-zero blocks in the two cases. In FIG. 6A, both immediately adjacent blocks 603 and 604 of the non-zero block 601 have non-zero coefficients, whereas in FIG. 6B, the non-zero block 611 in the to-be-coded multi-block partition is an isolated block, as both its adjacent blocks, blocks 613 and 614 within the multi-block partition, have all zero-valued coefficients.

One embodiment of determining the breakpoint to use for a multi-block partition uses a function of whether or not the blocks in the multi-block partition have any non-zero-valued coefficients and properties of blocks that are adjacent to the blocks in the multi-block partition.

One example function is denoted by S:

$$S = \Sigma_i \{n_z(i)*[1+a(i)+b(i)]\}$$

where * indicates multiplication, i denotes the blocks in the multi-block partition, with range from 1 to $N_B$, the number of blocks in the partition, $n_z(i)$ is a binary-valued quantity that indicates whether block i has non-zero coefficients, and, in one embodiment, $a(i)$, $b(i)$ are two binary-valued quantities that indicate whether the top adjacent and right adjacent blocks of block i have any non-zero coefficients. In one embodiment, $n_z(i)=1$ if the sequence of block i has non-zero coefficients, and $n_z(i)=0$ otherwise. Similarly, $a(i)$ or $b(i)=1$ if the sequence of one or the other immediately adjacent block to block i has any non-zero quantized coefficients.

For FIGS. 6A and 6B, i=1, 2, 3, 4, so $$S = n_z(1)*[1+a(1)+b(1)] + n_z(2)*[1+a(2)+b(2)] + n_z(3)*[1+a(3)+b(3)] + n_z(4)*[1+a(4)+b(4)].$$

One embodiment includes comparing a pre-defined threshold for S. Any multi-block partition for which S is below the threshold is encoded by only the selected high-frequency coding method. In one embodiment, no additional information is sent in such a case. Any multi-block partition for which S at least the pre-defined threshold is coded by hybrid variable length coding, including determining the single breakpoint to use for the partition using one of the methods described in the Per Multi-Block Breakpoint Determining patent application. The single breakpoint itself is encoded using variable length coding using different variable length coding tables for different values of S.

In one embodiment, the header for any block includes $n_z(i)$. At the decoder, the decoder receiving the header can reconstruct the value of S from $n_z(i)$ for blocks in the partition, and from previous $n_z(i)$ information of any adjacent block that is outside the partition. Reconstructing the S value allows the decoder to reconstruct the breakpoint value for the multi-block partition.

In another embodiment, $a(i)$ and $b(i)$ are two binary-valued quantities that indicate whether the top adjacent and right adjacent blocks of block i have a non-zero-valued optimal breakpoint. Such a non-zero-valued optimal breakpoint indicates that using a hybrid coding method including using a selected low-frequency coding method up to the end of the event defined by the optimal breakpoint provides a shorter bitstream than using only the selected high-frequency variable coding method. In such an embodiment, depending on the position of the block i, the corresponding $a(i)$ and/or $b(i)$ may depend on information within the multi-block partition itself. A decoder would need this information to determine the value of S. Therefore, in one embodiment, $a(i)$ indicates whether the top adjacent block has a nonzero optimal breakpoint in the case that such information is available, e.g., in the case the top adjacent block is not part of the multi-block partition, else, $a(i)$ indicates whether the top adjacent block has any non-zero quantized transform coefficients. Similarly, $b(i)$ indicates whether the right adjacent block has a nonzero optimal breakpoint in the case that such information is available, e.g., in the case the right adjacent block is not part of the multi-block partition, else, $b(i)$ indicates whether the right adjacent block has any non-zero quantized transform coefficients. This ensures that S can be determined at the decoder from only the $n_z(i)$ of block i and information from outside the to-be-decoded multi-block partition.

In an alternate embodiment, in the case that a(i) or b(i) is part of the multi-block partition, a value of 0 is used for the particular a(i) or b(i) or both a(i) and b(i) in calculating Additional Low-Frequency Coding Methods Different embodiments of the invention can use different methods for the low-frequency variable length coding method, and also different methods for the high-frequency coding methods.

One embodiment of the low-frequency coding method is described above and includes two-dimensional position and one-dimensional amplitude coding (2DP1DA).

One embodiments of the low-frequency variable length coding method includes using one-dimensional position and one-dimensional amplitude coding (1DP1DA) to represent the position and the coefficient amplitudes of any clusters in the low-frequency region. Conventional run-level coding is used to represent the position and amplitude information for each non-zero-valued coefficient individually. In one embodiment, for a cluster of non-zero-valued coefficients, an alternative way of denoting the position and amplitude information is to indicate (a) the run of zero-valued coefficients preceding the non-zero cluster, (b) the run of non-zero-valued coefficients in the cluster, and (c) the magnitudes (and the signs) of the non-zero-valued coefficients. Three symbols: zrun, nzrun, and level, are used to denote the information. Thus, one embodiment includes recognizing and coding events that are denoted by these symbols.

One embodiment of the invention that uses hybrid coding uses two-dimensional position and multi-dimensional amplitude coding (2DPmDA). In one version, this includes recognizing and encoding two-dimensional position events and rather than using one-dimensional amplitude variable length coding, using multi-dimensional variable length coding to encode runs of more than one consecutive non-zero-valued amplitudes. That is, for a run of "m" consecutive non-zero-valued coefficients, instead of using "m" one-dimensional variable length codes, a single 'm' dimensional code, e.g., coding table is used to code the entire 'm' coefficients.

One embodiment uses in the low-frequency method integrated position and amplitude coding (mDPAInt), also called joint position and amplitude coding. Rather than encoding the position and amplitude of clustered non-zero-valued coefficients in the low-frequency region independently, some embodiments of low-frequency encoding include jointly coding the position and the amplitude events.

One embodiment uses in the low-frequency method integrated position and amplitude coding with low valued amplitude and low number of clusters coding, e.g., 3D integrated position and amplitude coding Other low-frequency and high-frequency encoding methods are possible, as described in the above-cited incorporated-by-reference patent applications.

Decoding

While the above descriptions were mostly of coding methods, those in the art will understand that the present description also leads to decoding methods and apparatuses that decode a bitstream that was coded by any of the coding embodiments described herein.

One embodiment includes a method comprising determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition. The method further includes encoding the ordered sequence of quantized transform coefficients of the block, or the ordered sequences of the multi-block partition, the encoding using hybrid variable length coding using the determined breakpoint. The method further includes, in the case information additional to the properties of the neighboring blocks would be needed by a decoder or decoding process to determine the determined breakpoint, encoding sufficient information about the relationship such that a decoder or decoding process can, prior to decoding the coded data of the block or multi-block partition use the sufficient information and the properties of the neighboring blocks to determine the breakpoint used to encode the coded data of the block or multi-block partition. The properties and the neighboring blocks are such that in the decoding, the properties of the neighboring blocks are known or determinable prior to the decoding of the coded data of the block or multi-block partition.

The decoding method includes decoding any such additional information for the to-be-decoded block or multi-block partition, and determining the properties of blocks neighboring the to-be-decoded block or multi-block partition. The decoding method further includes determining the breakpoint used to encode the to-be-decoded block or multi-block partition using the determined properties of blocks neighboring the to-be-decoded block or multi-block partition. The decoding method further includes recognizing codewords in the bitstream; and decoding the recognized codewords to determine the sequence or sequences of the block or multi-block partition.

Performance Evaluation

The inventors tested the presented approaches by implementing the methods in a coder that conforms to ITU-T recommendation H.263 (ITU-T, "Video coding for low bitrate communications," Draft Recommendation H.263, May 1996) using the reference codec software known as "Video Codec Test Model Near-Term, Version 3 (TMN3), Release 0", H.263 Ad Hoc Group. TMN 3.0 was previously released to the public by the Signal Processing and Multimedia Group, University of British Columbia, spmg.ece.ubc.ca. H.263 uses an 8×8-block DCT and run-level variable length coding for the quantized transform coefficients. Differently, for INTRA-coded blocks, the DC (0, 0) coefficient, after 8×8 DCT, is encoded separately and the remaining 63 AC coefficients are encoded by run-level variable length coding, whereas for INTER-coded blocks, all the 64 coefficients are encoded by run-level variable length coding. For multi-block partition, it is referred to 16×16-macroblock (MB), which contains four 8×8 blocks.

Video sequences used in the tests included three resolutions: QCIF (176×144), CIF (352×288), and 4CIF (704×576), with two sequences for each resolution. Each test sequence had 300 frames with a frame rate of 30 frames per second (fps). In every 15 frames 1 frame was enforced to be coded as an INTRA-frame. For both INTRA- and INTER-coded frames, a quantization parameter (QP) of 6 was used.

The coding approaches were investigated following three steps: statistics collection, code-table generation, and codec implementation. In the first step, event statistics were collected from a set of test video sequences. Such statistics include the statistics of the breakpoint, the statistics of the low-frequency event, and the statistics of the high-frequency event. Each type of statistics was collected for INTRA- and INTER-coded blocks, respectively.

Using the collected statistics, Huffman code tables were generated for the variable length coding. To limit the size of the code tables, only events with non-zero frequencies in the statistics were assigned with code words. All the remaining events were coded by an 'Escape' code followed by certain numbers of bits to represent the information. For example, a 2D position event that is not assigned with a code word will be encoded by 'Escape' followed by 6 bits for the run-length of zeros, 6 bits for the run-length of non-zero coefficients, and 1 bit to indicate the last non-zero coefficient in the block.

While hybrid variable length coding code tables were constructed based on the statistics collected from test sequences, one embodiment of the methods described above included using initial code tables to find the optimal breakpoint and collect the statistics. This contradiction was resolved by using hybrid variable length coding code tables generated with a fixed breakpoint as initial tables and updating them iteratively with collected statistics. After that, the final code tables were generated.

The results showed that the methods described herein using variable breakpoints improved the coding performance of hybrid variable length coding on both INTRA- and INTER-coded blocks, compared to the case of constant breakpoint.

Using the context of adjacent blocks was found to be especially effective for INTER-coded blocks where more of the quantized coefficients are zero.

While the investigation the inventors performed used transform coefficients that were quantized using a quantization parameter (QP) of 6, other embodiments can use different quantization parameters. Tests with other sequences and other quantization parameters can lead to different, e.g., different optimized variable length coding tables.

Apparatus

While the above descriptions were mostly of coding methods, those in the art will understand that from the above description, a coding apparatus can straightforwardly be built, so that some embodiments of the invention are in the form of coding apparatuses. Furthermore, a decoding apparatus can be built.

Figure 7:
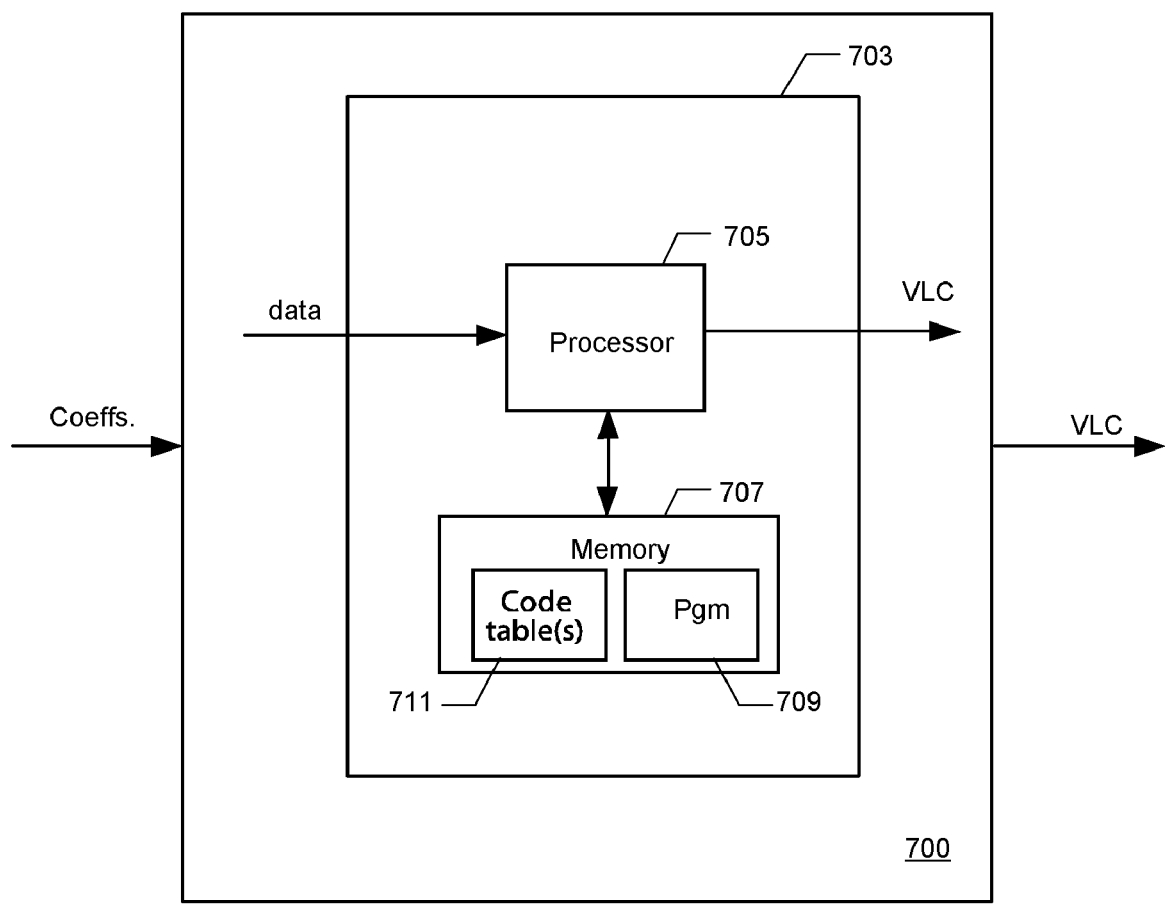
FIG. 7 shows an embodiment that includes an apparatus that is operable to implement a coding method as described herein.

FIG. 7 shows an embodiment that includes an apparatus 700 that is operable to implement a coding method as described herein, including determining a variable breakpoint and encoding the location of the breakpoint. Apparatus 700 includes processing system 703 that includes one or more processors 705 and a memory 707. A single processor is shown in FIG. 7 and those in the art will appreciate that this may represent several processors. Similarly, a single memory subsystem 707 is shown, and those in the art will appreciate that the memory subsystem may include different elements such as RAM, ROM, and so forth. In addition, the memory subsystem is meant to include any non-volatile memory storage such as a magnetic or optical storage component. A computer program 709 is included and is loaded into the memory 707. Note that at any time, some of the programs may be in the different parts of the memory subsystem, as will be understood by those in the art. The program 709 includes instructions to instruct the processor to implement, in different versions, the different coding methods usable as the second variable length coding method. In the embodiment shown, the method uses one or more coding tables 711 in the memory subsystem 707.

Figure 8:
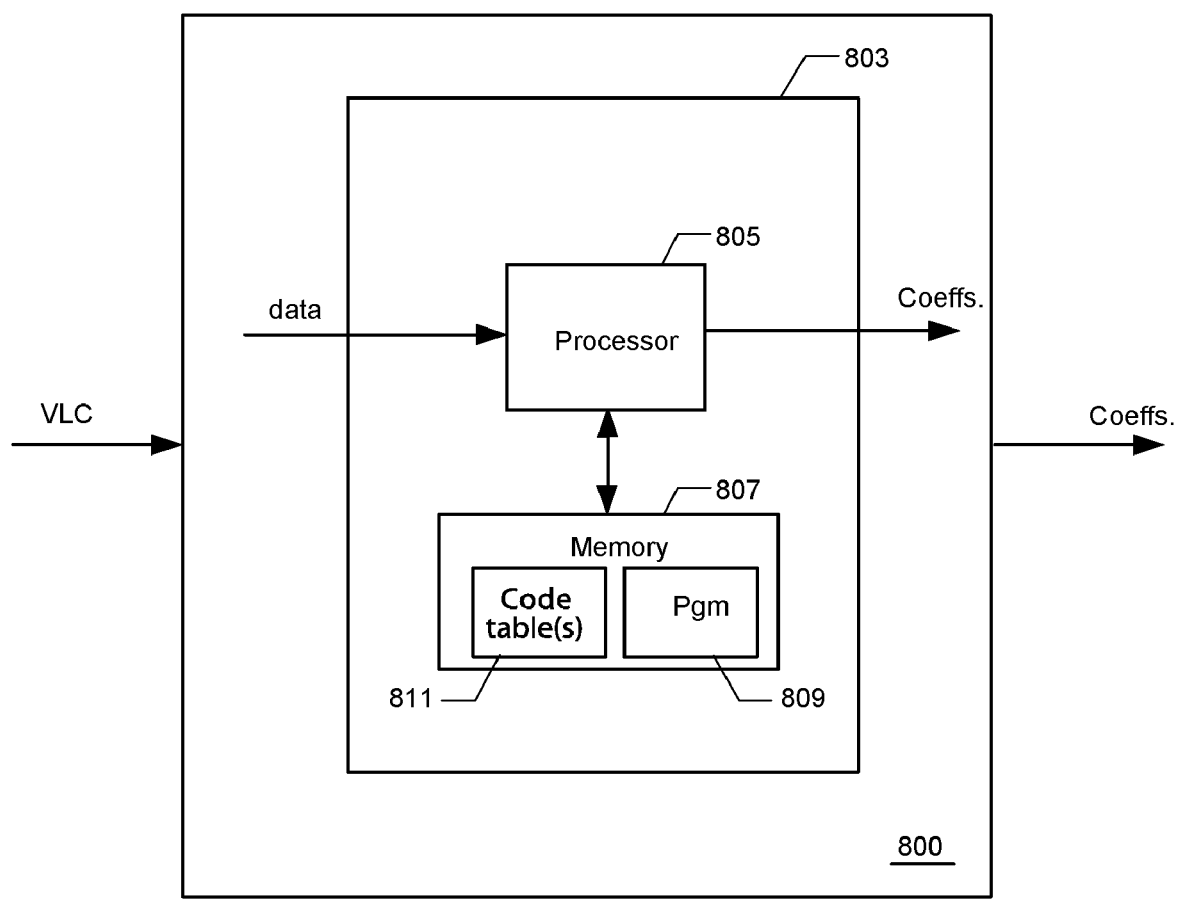
FIG. 8 shows ah embodiment that includes an apparatus operable to implement a decoder of a variable length coding method described herein

FIG. 8 shows another embodiment that includes an apparatus 800 operable to implement a decoder of a variable length coding method described herein that includes determining a variable breakpoint. Decoding apparatus 800 includes a processing system 803 that includes one or more processors 805 and a memory 807. A single processor is shown in FIG. 8 and those in the art will appreciate that this may represent several processors. Similarly, a single memory subsystem 807 is shown, and those in the art will appreciate that the memory subsystem may include different elements such as RAM, ROM, and so forth. In addition, the memory subsystem is meant to include any non-volatile memory storage such as a magnetic or optical storage component. A computer program 809 is included and is loaded into the memory 807. Note that at any time, some of the programs may be in the different parts of the memory subsystem, as will be understood by those in the art. The program 809 includes instructions to instruct the processor to implement, in different versions, the decoding process described above, including determining the properties of neighboring blocks and using the properties to determine the breakpoint used to encode a block or multi-block partition, and recognizing and decoding of codewords. In the embodiment shown, the decoding method uses one or more coding tables 811 in the memory subsystem 807.

Other embodiments include logic encoded in one or more tangible media for execution and when executed operable to carry out any of the coding methods described herein. How to implement such logic would be clear to one in the art from the description herein.

Other embodiments include logic encoded in one or more tangible media for execution and when executed operable to carry out any of the decoding methods described herein. How to implement such logic would be clear to one in the art from the description herein.

Other embodiments include software encoded in one or more computer-readable media and when executed operable to carry out any of the coding methods described herein. How to implement such software would be clear to one in the art from the description herein.

Other embodiments include software encoded in one or more computer-readable media and when executed operable to carry out any of the decoding methods described herein. How to implement such software would be clear to one in the art from the description herein.

Other embodiments include a computer-readable carrier medium carrying a set of instructions that when executed by one or more processors of a processing system cause the one or more processors to carry out any of the coding methods described herein.

Other embodiments include a computer-readable carrier medium carrying a set of instructions that when executed by one or more processors of a processing system cause the one or more processors to carry out any of the decoding methods described herein.

As described above, alternative low-frequency coding schemes with variable breakpoints, such as the integrated position and amplitude coding, can be used. See the above-referenced and incorporated herein by reference patent applications for alternate low-frequency and high-frequency methods.

The term "sequence" as used herein for the sequence of quantized coefficients is sometimes referred to as a "block" of coefficients, and also as a "series" of coefficients. Those in the art will understand that such terms may be interchangeably used and the meaning would be clear to those in the art from the context.

Note that the description herein assumes that each series includes two regions, a low-frequency region, and a high-frequency region. It is possible to partition the whole sequence containing all the coefficients of the transforming, quantizing and ordering the block of image data. The methods described herein would then be applicable to a sequence that does not necessarily include all of the quantized coefficients but that still includes a low-frequency region where non-zerovalued quantized coefficients are likely to be clustered, and an immediately following high-frequency region where non-zero-valued quantized coefficients are likely to be scattered amongst zero-valued quantized coefficients. Those in the art will therefore understand that the claims herein are applicable to such a case, the breakpoint being the location between the low- and high-frequency regions. For example, the sequence in such a case could include just low- and high-frequency regions and not the whole sequence of quantized transform coefficients.

Also, in the description, it is assumed that the sequence includes only the AC coefficients and that the DC coefficient of the transform of the block is separately encoded. How to modify the methods described herein to include the DC coefficient would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or symbols are used for the most likely-to-occur quantized value or values, and different other values or symbols are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The discrete cosine transform (DCT) is one possible transform. Other transforms may be used, e.g., the new H.264/MEG-4 AVC video coding standard/draft standard defines 4×4 blocks and a DCT-like 4×4 integer transform.

The invention does not depend on any particular type of inter-frame coding if used, or of motion compensation if used for inter-frame coding, or any intra-estimation if used for estimating the pixels of a block using information from neighboring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any non-zero-valued coefficients. In one version, the sign information for any runs of non-zero amplitudes in any region is added together with the information of each amplitude. In an alternate embodiment, the sign information for any runs of non-zero amplitudes in any region may be included in a different manner, e.g., as a code for the series of signs. Other alternate embodiments are also possible for encoding the sign.

Note that in some examples for amplitude encoding, 63 or 127 possible non-zero values can be assumed for the coefficients. The invention however is not restricted to any number of possible quantization values.

Note also that the term amplitude is irrespective of sign. Therefore, for example, coefficient of values +1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of coder, or a decoder. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, (i) in one set of embodiment, a tangible computer-readable medium, e.g., a solid-state memory, or a computer software product encoded in computer-readable optical or magnetic media; (ii) in a different set of embodiments, a medium bearing a propagated signal detectable by at least one processor of one or more processors and representing a set of instructions that when executed implement a method; (iii) in a different set of embodiments, a carrier wave bearing a propagated signal detectable by at least one processor of the one or more processors and representing the set of instructions a propagated signal and representing the set of instructions; (iv) in a different set of embodiments, a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
(a) determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition,
wherein the quantized transform coefficients have respective amplitudes of a set of amplitudes including a most likely-to-occur amplitude,
wherein the hybrid variable length coding an ordered sequence of quantized transform coefficients of a block includes recognizing any event that includes a cluster of one or more consecutive quantized coefficients having amplitude other than the most likely-to-occur amplitude, encoding a first part of the sequence using a selected low-frequency coding method, the selected low-frequency coding method including recognizing an ending event, the encoding a first part being up to and including the recognized ending event, and encoding a second part of the sequence starting from immediately after the recognized ending event using a selected high-frequency coding method,
wherein the breakpoint indicates the location of the ending event in the sequence;
(b) encoding the ordered sequence of quantized transform coefficients of the block, or the ordered sequences of the multi-block partition, using the hybrid variable length coding and the recognized ending event; and
(c) in the case information additional to the properties of the neighboring blocks would be needed by a decoder or decoding process to determine the breakpoint determined in (a), encoding sufficient information about the relationship such that a decoder or decoding process can, prior to decoding the coded data of the block or multi-block partition use the sufficient information and the properties of the neighboring blocks to determine the breakpoint used to encode the coded data of the block or multi-block partition,
such that the breakpoint may be variable among blocks of an image,
wherein the properties and the neighboring blocks are such that in the decoding, the properties of the neighboring blocks are known or determinable prior to the decoding of the coded data of the block or multi-block partition.

2. A method as recited in claim 1,
wherein for each ordered sequence of quantized transform coefficients of a block, an optimal breakpoint exists that indicates an optimal ending event for encoding the sequence using the hybrid variable length coding, including encoding a first part of the sequence using the selected low-frequency coding method up to and including the optimal ending event and encoding a second part of the sequence starting from immediately after the optimal ending event using the selected high-frequency coding method, the optimal ending event being such that the encoding results in equal or shorter codewords than when any other ending event is used, and
wherein the properties related to neighboring blocks include the optimal breakpoints of the sequences of quantized transform coefficients of the neighboring blocks.

3. A method as recited in claim 2, wherein the optimal breakpoint for each ordered sequence of quantized transform coefficients of a block is determined by a method that includes for the ordered sequence of quantized transform coefficients of the block, (i) determining a set of possible breakpoints, each breakpoint respectively indicating an ending event recognized by the selected low-frequency coding method, and determining the numbers of bits of hybrid variable length coding the sequence using the respective ending events indicated by the breakpoints;

(ii) comparing the numbers of bits determined in (i);

(iii) selecting as a final ending event the ending event that results in the least total number of bits in the comparing of (ii); and (iv) selecting as the optimal breakpoint a coefficient position in the selected final ending event.

4. A method as recited in claim 2,
wherein for a selected coding and decoding order for a particular block or multi-block partition, the neighboring blocks are the immediately adjacent blocks that are vertically and horizontally adjacent to the particular block or multi-block partition and whose properties are known or determinable at the time of coding or decoding for the coding and decoding order,
wherein the breakpoint determined in (a) is the average of any of the neighboring blocks that are available assuming a coding and decoding order.

5. A method as recited in claim 2,
wherein the determining of (a) determines a breakpoint for a single block,
for a selected coding and decoding order for a particular block, the neighboring blocks are the immediately adjacent blocks that are vertically and horizontally adjacent to the particular block and whose properties are known or determinable at the time of coding or decoding for the coding and decoding order,
wherein the breakpoint determined in (a) is the optimal breakpoint of the adjacent block that would lead to the shorter bitstream if each respective adjacent block's optimal breakpoint is used to encode the respective adjacent block.

6. A method as recited in claim 5, further comprising encoding which of the adjacent block's optimal breakpoint defines the breakpoint.

7. A method as recited in claim 1, wherein the properties related to neighboring blocks include whether or not the sequences of quantized transform coefficients of the neighboring blocks have any non-zero valued quantized transform coefficients.

8. A method as recited in claim 7,
wherein the determining of (a) determines a breakpoint for a multi-block partition,
the method further comprising: encoding for each respective block in the multi-block whether or not the block has any non-zero coefficients, and
wherein the determining of (a) uses information for each respective block in the multi-block partition on whether or not the block has any non-zero coefficients,
such that an encoder, prior to determining the breakpoint used to encode a multi-block partition, has information for each respective block in the multi-block partition on whether or not the block has any non-zero coefficients.

9. A method as recited in claim 8,
wherein for a selected coding and decoding order for a multi-block partition, the neighboring blocks are the immediately adjacent blocks that are vertically and horizontally adjacent to the particular multi-block partition and whose properties are known or determinable at the time of coding or decoding for the coding and decoding order, and
wherein the breakpoint determining in (a) uses a function of whether or not the blocks in the multi-block partition have any non-zero-valued coefficients and properties of blocks that are adjacent to the blocks in the multi-block partition.

10. A method as recited in claim 1, wherein the properties related to neighboring blocks include whether or not the sequences of quantized transform coefficients of the neighboring blocks have an optimal breakpoint that has a non-zero value.

11. A method as recited in claim 1, wherein information about the relationship need not be sent to the encoder for the encoder to determine the breakpoint for a coded block or multi-block partition.

12. A method as recited in claim 1, wherein for a selected coding and decoding order for a particular block or multi-block partition, the neighboring blocks are the immediately adjacent blocks that are vertically and horizontally adjacent to the particular block or multi-block partition and whose properties are known or determinable at the time of coding or decoding for the coding and decoding order.

13. A method as recited in claim 1, wherein the quantized transform coefficients are such that 0 is the most likely to occur amplitude, and 1 is the next to most likely to occur amplitude.

14. A method as recited in claim 1, wherein the selected low-frequency coding method includes one-dimensional position and one-dimensional amplitude coding.

15. A method as recited in claim 1, wherein the selected low-frequency coding method includes two-dimensional position and one-dimensional amplitude coding.

16. A method as recited in claim 1, wherein the selected low-frequency coding method includes integrated position and amplitude coding.

17. A method as recited in claim 1, wherein the selected low-frequency coding method includes two-dimensional position and multi-dimensional amplitude coding.

18. A method as recited in claim 1, wherein the selected low-frequency coding method includes integrated position and amplitude coding with low valued amplitude and low number of clusters coding.

19. An apparatus comprising a programmable processing system including one or more processors coupled to a memory, programmed to carry out a method comprising:

(a) determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition,
wherein the quantized transform coefficients have respective amplitudes of a set of amplitudes including a most likely-to-occur amplitude,
wherein the hybrid variable length coding an ordered sequence of quantized transform coefficients of a block includes recognizing any event that includes a cluster of one or more quantized coefficients having amplitude other than the most likely-to-occur amplitude, encoding a first part of the sequence using a selected low-frequency coding method up to and including an ending event recognized by the selected low-frequency coding method, and encoding a second part of the sequence starting from immediately after the ending event using a selected high-frequency coding method,
wherein the breakpoint indicates the location of the ending event in the sequence;
(b) encoding the ordered sequence of quantized transform coefficients of the block, or the ordered sequences of the multi-block partition, using the hybrid variable length coding and the ending event indicated by the breakpoint determined in (a); and
(c) in the case information additional to the properties of the neighboring blocks would be needed by a decoder or decoding process to determine the breakpoint determined in (a), encoding sufficient information about the relationship such that a decoder or decoding process can, prior to decoding the coded data of the block or multi-block partition use the sufficient information and the properties of the neighboring blocks to determine the breakpoint used to encode the coded data of the block or multi-block partition,
such that the breakpoint may be variable among blocks of an image,
wherein the properties and the neighboring blocks are such that in the decoding, the properties of the neighboring blocks are known or determinable prior to the decoding of the coded data of the block or multi-block partition.

20. An apparatus as recited in claim 19,
wherein for each ordered sequence of quantized transform coefficients of a block, an optimal breakpoint exists that indicates an optimal ending event for encoding the sequence using the hybrid variable length coding, including encoding a first part of the sequence using the selected low-frequency coding method up to and including the optimal ending event and encoding a second part of the sequence starting from immediately after the optimal ending event using the selected high-frequency coding method, the optimal ending event being such that the encoding results in equal or shorter codewords than when any other ending event is used, and
wherein the properties related to neighboring blocks include the optimal breakpoints of the sequences of quantized transform coefficients of the neighboring blocks.

21. An apparatus as recited in claim 19, wherein the properties related to neighboring blocks include whether or not the sequences of quantized transform coefficients of the neighboring blocks have any non-zero valued quantized transform coefficients.

22. An apparatus as recited in claim 21,
wherein the determining of (a) determines a breakpoint for a multi-block partition,
wherein the method further comprises encoding for each respective block in the multi-block whether or not the block has any non-zero coefficients, and
wherein the determining of (a) uses information for each respective block in the multi-block partition on whether or not the block has any non-zero coefficients on whether or not the block has any non-zero coefficients,
such that an encoder, prior to determining the breakpoint used to encode a multi-block partition, has information for each respective block in the multi-block partition on whether or not the block has any non-zero coefficients.

23. A non-transitory computer-readable medium configured with instructions that when executed by one and more processors of a processing system, cause carrying out a method, the method comprising:
(a) determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition,
wherein the quantized transform coefficients have respective amplitudes of a set of amplitudes including a most likely-to-occur amplitude,
wherein the hybrid variable length coding an ordered sequence of quantized transform coefficients of a block includes recognizing any event that includes a cluster of one or more consecutive quantized coefficients having amplitude other than the most likely-to-occur amplitude, encoding a first part of the sequence using a selected low-frequency coding method, the selected low-frequency coding method including recognizing an ending event, the encoding a first part being up to and including the recognized ending event, and encoding a second part of the sequence starting from immediately after the recognized ending event using a selected high-frequency coding method,
wherein the breakpoint indicates the location of the ending event in the sequence;
(b) encoding the ordered sequence of quantized transform coefficients of the block, or the ordered sequences of the multi-block partition, using the hybrid variable length coding and the recognized ending event; and
(c) in the case information additional to the properties of the neighboring blocks would be needed by a decoder or decoding process to determine the breakpoint determined in (a), encoding sufficient information about the relationship such that a decoder or decoding process can, prior to decoding the coded data of the block or multi-block partition use the sufficient information and the properties of the neighboring blocks to determine the breakpoint used to encode the coded data of the block or multi-block partition,
such that the breakpoint may be variable among blocks of an image,
wherein the properties and the neighboring blocks are such that in the decoding, the properties of the neighboring blocks are known or determinable prior to the decoding of the coded data of the block or multi-block partition.

24. A non-transitory computer-readable medium as recited in claim 23, wherein the quantized transform coefficients are such that 0 is the most likely-to-occur amplitude, and 1 is the next to most likely-to-occur amplitude.

25. A non-transitory computer-readable medium as recited in claim 23, wherein the method further comprises encoding the location of the final ending event.

26. A method of decoding comprising:
accepting a bitstream that includes codewords of a to-be-decoded block or multi-block partition of image data encoded by a coding method, the coding method including:
(a) determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition,
wherein the quantized transform coefficients have respective amplitudes of a set of amplitudes including a most likely-to-occur amplitude,
wherein the hybrid variable length coding an ordered sequence of quantized transform coefficients of a block includes recognizing any event that includes a cluster of one or more consecutive quantized coefficients having amplitude other than the most likely-to-occur amplitude, encoding a first part of the sequence using a selected low-frequency coding method, the selected low-frequency coding method including recognizing an ending event, the encoding a first part being up to and including the recognized ending event, and encoding a second part of the sequence starting from immediately after the recognized ending event using a selected high-frequency coding method, wherein the breakpoint indicates the location of the ending event in the sequence;

(b) encoding the ordered sequence of quantized transform coefficients of the block, or the ordered sequences of the multi-block partition, using the hybrid variable length coding and the recognized ending event; and (c) encoding any additional information about the relationship that together with the properties of the neighboring blocks is sufficient to determine the breakpoint used to encode the coded data of the to-be-decoded block or multi-block partition, such that the breakpoint may be variable among blocks of an image, decoding any such additional information for the to-be-decoded block or multi-block partition;

determining the properties of blocks neighboring the to-be-decoded block or multi-block partition;

determining the breakpoint used to encode the to-be-decoded block or multi-block partition using the determined properties of blocks neighboring the to-be-decoded block or multi-block partition;

recognizing codewords in the bitstream; and decoding the recognized codewords to determine the sequence or sequences of the block or multi-block partition.

27. A non-transitory computer-readable medium configured with instructions that when executed by one or more processors of a processing system cause carrying out a method, the method comprising:

accepting a bitstream that includes codewords of a to-be-decoded block or multi-block partition of image data encoded by a coding method, the coding method including:

(a) determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition, wherein the quantized transform coefficients have respective amplitudes of a set of amplitudes including a most likely-to-occur amplitude, wherein the hybrid variable length coding an ordered sequence of quantized transform coefficients of a block includes recognizing any event that includes a cluster of one or more consecutive quantized coefficients having amplitude other than the most likely-to-occur amplitude, encoding a first part of the sequence using a selected low-frequency coding method, the selected low-frequency coding method including recognizing an ending event, the encoding a first part being up to and including the recognized ending event, and encoding a second part of the sequence starting from immediately after the recognized ending event using a selected high-frequency coding method, wherein the breakpoint indicates the location of the ending event in the sequence;

(b) encoding the ordered sequence of quantized transform coefficients of the block, or the ordered sequences of the multi-block partition, using the hybrid variable length coding and the recognized ending event; and (c) encoding any additional information about the relationship that together with the properties of the neighboring blocks is sufficient to determine the breakpoint used to encode the coded data of the to-be-decoded block or multi-block partition, such that the breakpoint may be variable among blocks of an image, decoding any such additional information for the to-be-decoded block or multi-block partition;

determining the properties of blocks neighboring the to-be-decoded block or multi-block partition;

determining the breakpoint used to encode the to-be-decoded block or multi-block partition using the determined properties of blocks neighboring the to-be-decoded block or multi-block partition;

recognizing codewords in the bitstream; and decoding the recognized codewords to determine the sequence or sequences of the block or multi-block partition.

* * * * *

UNITED STATES PATENT AND TRADEMARK OFFICE
CERTIFICATE OF CORRECTION

| | | |
|---|---|---|
| PATENT NO. | : 8,135,071 B2 | |
| APPLICATION NO. | : 11/686898 | |
| DATED | : March 13, 2012 | |
| INVENTOR(S) | : Tian et al. | |

It is certified that error appears in the above-identified patent and that said Letters Patent is hereby corrected as shown below:

In Column 14, line 62, after "of", kindly replace "nbits opt(A))" with --nbits($N_{opt}(A)$)--.

In Column 17, line 7, after "calculating", kindly insert --S.--.

In Column 27, line 12, after "least", kindly delete "total".

Signed and Sealed this
Twenty-eighth Day of August, 2012

David J. Kappos
*Director of the United States Patent and Trademark Office*